US012071186B1

(12) United States Patent
Chen et al.

(10) Patent No.: US 12,071,186 B1
(45) Date of Patent: Aug. 27, 2024

(54) STEERING WHEEL TORQUE FEEDBACK OPTIMIZATION CONTROL METHOD FOR DIFFERENTIAL BRAKING SYSTEM

(71) Applicant: TONGJI UNIVERSITY, Shanghai (CN)

(72) Inventors: Hong Chen, Shanghai (CN); Lin Zhang, Shanghai (CN); Rongjie Yu, Shanghai (CN); Qiang Meng, Shanghai (CN); Jinlong Hong, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 18/539,245

(22) Filed: Dec. 13, 2023

(30) Foreign Application Priority Data

Apr. 4, 2023 (CN) .......................... 202310363231.8

(51) Int. Cl.
*B62D 6/00* (2006.01)
*B60W 10/20* (2006.01)
*B60W 40/114* (2012.01)
*B60W 50/00* (2006.01)
*B62D 5/00* (2006.01)

(52) U.S. Cl.
CPC ............. *B62D 6/008* (2013.01); *B60W 10/20* (2013.01); *B60W 40/114* (2013.01); *B60W 50/0097* (2013.01); *B62D 5/005* (2013.01); B60W 2050/0031 (2013.01); B60W 2520/14 (2013.01)

(58) Field of Classification Search
CPC ..................................................... B62D 5/005
See application file for complete search history.

(56) References Cited

U.S. PATENT DOCUMENTS

2002/0109402 A1 * 8/2002 Nakamura .......... B60T 8/17552
303/146

FOREIGN PATENT DOCUMENTS

CN          113733929 A  * 12/2021

* cited by examiner

*Primary Examiner* — Jaime Figueroa
*Assistant Examiner* — Jerrod Irvin Davis
(74) *Attorney, Agent, or Firm* — Bochner PLLC; Andrew D. Bochner

(57) ABSTRACT

Disclosed is a steering wheel torque feedback optimization control method for a differential braking system, including: estimating a tire lateral force of a vehicle; predicting a state of the vehicle at a next moment under a non-differential torque condition; predicting a state of the vehicle at the next moment under a differential torque condition with an additional yaw moment; calculating tire lateral forces at the next moment under the differential torque condition and the non-differential torque condition separately based on the predicted states of the vehicle at the next moment under the differential torque condition and the non-differential torque condition, and obtaining a predicted one-step change value of a front tire lateral force by performing subtraction; performing integral calculation based on time, and obtaining a continuous change amount of the tire lateral force; and correcting a desired moment of a steering power motor.

10 Claims, 3 Drawing Sheets

STEERING WHEEL TORQUE FEEDBACK OPTIMIZATION CONTROL METHOD FOR DIFFERENTIAL BRAKING SYSTEM

CROSS REFERENCE TO RELATED APPLICATION

This patent application claims the benefit and priority of Chinese Patent Application No. 202310363231.8, filed with the China National Intellectual Property Administration on Apr. 4, 2023, the disclosure of which is incorporated by reference herein in its entirety as part of the present application.

TECHNICAL FIELD

The present disclosure relates to the field of driving steering wheel torque feedback optimization, in particular to a steering wheel torque feedback optimization control method for a differential braking system.

BACKGROUND

With the advancement of technology and the expectation of more comfortable and safer ways of traveling, vehicles have a tendency towards intelligence and electrification. In this process, differential braking plays a promising role in improving vehicle dynamics and driving experience. With differential braking, the steering capability of a vehicle can be enhanced, and the burden of driving can be eased; or the stability of a vehicle can be improved, and dangerous conditions of drifting, etc. can be avoided, for example. Despite having a promising future, a differential braking system still faces the risk of interfering with a driver. During operation of the system, a lateral force of a wheel will change due to an additional yaw moment provided by differential braking although a steering angle of a steering wheel does not change, which changes a hand force moment of a driver.

Extensive research on the issue of hand force change caused by active steering systems has conducted. As disclosed in CN1137998721B, with a steering angle signal from a steering angle sensor of a steering wheel and a moment signal from a moment sensor of a steering wheel received through a CAN bus, a driving direction and a driving angle are determined, and then an assistant moment is determined. Similarly, as in CN107839749A, an ideal driving steering wheel torque feedback characteristic diagram is designed through a vehicle system dynamics model, in order to improve driving experience. Further, as disclosed in CN112572606B, conditions are classified based on an SVM and a BP neural network, moment assistance is weakened in dangerous conditions, so comfort and safety are coordinated. In the above technical solutions, estimation of the change of the hand moment depends on the change of a front wheel steering angle, but which does not change in an operation process of a differential torque assistance system. Therefore, the change of the hand moment caused by a differential braking system fails to be processed in the above solutions.

As disclosed in CN110606121B, based on a steer-by-wire system, a load state observer constructed by means of an output moment of a steering motor calculates a steering load moment, and then a desired assistant moment is optimized by means of the changed steering load moment. Further, in Kalman Filter-Based Fusion Estimation Method of Steering Feedback Torque for Steering-by-Wire Systems, a steering load moment estimated by a vehicle system dynamics model and a steering load moment constructed by means of an output moment of a steering motor are gathered by a Kalman filter, so the accuracy of the steering load moment is improved, and improvement in the hand moment is possible. However, the above technical solutions are passive solutions, all of which adopt means of suppressing changes after the steering moment has changed. In Research on control mechanism of active steering and steering feeling of EPS system with the interference of active steering, a relation diagram of an additional steering angle applied by an assistance system and a change of a steering moment is obtained through experiments. In practice, the change of the steering moment is predicted by querying the relation diagram. Despite some achievements, the conditions to be enumerated are huge, the workload is large, and it is likely to make mistakes in assistant moment decision due to insufficient coverage of the relation diagram.

As can be seen from the above, a conventional method for prediction based on a change of a front wheel steering angle is inapplicable to prediction of a steering moment changed by a tire longitudinal force in a differential braking system. Moreover, a solution of observing a change of a steering load based on a motor moment makes it difficult to predict the change in advance. A steering wheel torque feedback optimizing solution for a moment change caused by a differential braking system is still unavailable in existing research.

SUMMARY

An objective of the present disclosure is to provide a steering wheel torque feedback optimization control method for a differential braking system, to solve the problem that a sudden change of a steering hand moment caused when a differential braking system assists in driving influences driver experience. The method can expand an existing technical solution for solving a change of a hand moment caused by a change of a front wheel steering angle.

The objective of the present disclosure can be achieved by the following technical solution:

A steering wheel torque feedback optimization control method for a differential braking system includes:

S1: estimating a tire lateral force of a vehicle based on a two-degree-of-freedom vehicle model and a nonlinear tire model;

S2: predicting a state of the vehicle at a next moment based on the tire lateral force under a non-differential torque condition by using a moment-balance-based two-degree-of-freedom vehicle model;

S3: estimating a state change rate of the vehicle based on the tire lateral force under a differential torque condition by using an improved two-degree-of-freedom vehicle model with an additional yaw moment, and predicting a state of the vehicle at the next moment under the differential torque condition;

S4: calculating tire lateral forces at the next moment under the differential torque condition and the non-differential torque condition separately by using the nonlinear tire model based on the predicted states of the vehicle at the next moment under the differential torque condition and the non-differential torque condition, and obtaining a predicted one-step change value of a front tire lateral force under an influence of a differential torque by performing subtraction;

S5: integrating the predicted one-step change value of a front tire lateral force based on time for calculation, and obtaining a continuous change amount of the tire lateral force; and S6: correcting a desired moment of a steering power motor based on the continuous change amount of the tire lateral force, suppressing a change of a hand moment, and optimizing driving experience.

The tire lateral force of the vehicle in S1 is estimated and calculated as follows:

$$\alpha_1 = \delta_f - \arctan\left(\frac{v_y + a\gamma}{v_x}\right)$$

$$\alpha_2 = \arctan\left(\frac{-v_y + b\gamma}{v_x}\right)$$

$$F_{y1\_p} = \mu * m * g * b/(a+b) * \left(\frac{2}{1+e^{-35\alpha_1}} - 1\right)$$

$$F_{y2\_p} = \mu * m * g * a/(a+b) * \left(\frac{2}{1+e^{-35\alpha_2}} - 1\right)$$

in the formulas: a and b are a distance between a front wheel and center of mass of the vehicle and a distance between a rear wheel and the center of mass of the vehicle respectively; m is mass of the vehicle; $v_x$ and $v_y$ are a lateral velocity and a longitudinal velocity of the vehicle respectively; $\gamma$ is a yaw rate of the vehicle; g is acceleration of gravity; $\mu$ is a ground adhesion coefficient; $\delta_f$ is a steering angle of a steering wheel in a current state; $\alpha_1$ and $\alpha_2$ represent a front wheel slip angle and a rear wheel slip angle of the vehicle respectively; and $F_{y1\_p}$ and $F_{y2\_p}$ are a front tire lateral force and a rear tire lateral force of the vehicle respectively.

The state of the vehicle at the next moment under the non-differential torque condition in S2 is predicted and calculated as follows:

$$\begin{cases} \dot{\gamma} = (F_{y1\_p} * a - F_{y2\_p} * b)/I_z \\ \dot{\beta} = (F_{y1\_p} + F_{y2\_p})/(mv_x) - \gamma \end{cases}$$

$$\gamma^* = \dot{\gamma} * t + \gamma \beta^* = \dot{\beta} * t + \beta$$

in the formulas: $\gamma$ and $\dot{\gamma}$ are the yaw rate and yaw acceleration respectively; $\beta$ and $\dot{\beta}$ are a sideslip angle and a change rate of the sideslip angle respectively; t is a step size calculated by a controller; $\gamma^*$ and $\beta^*$ are predicted values of the yaw rate and the sideslip angle of the vehicle at the next moment respectively; and $I_z$ is a moment of inertia of the vehicle.

The state of the vehicle at the next moment under the differential torque condition in S3 is predicted and calculated as follows:

$$\begin{cases} \dot{\gamma}_m = (F_{y1\_p}a - F_{y2\_p}b + \Delta M)/I_z \\ \dot{\beta}_m = (F_{y1\_p} + F_{y2\_p})/(mv_x) - \gamma \end{cases}$$

$$\gamma_m^* = \dot{\gamma}_m * t + \gamma \beta_m^* = \dot{\beta}_m * t + \beta$$

in the formulas: $\gamma$ is the yaw rate, $\dot{\gamma}_m$ is an estimated value of yaw acceleration of the vehicle under the differential torque condition; $\beta$ is a sideslip angle, and $\dot{\beta}_m$ is a change rate of the sideslip angle of the vehicle under the differential torque condition; $\dot{\gamma}_m$ and $\dot{\beta}_m$ represent a change rate of the state of the vehicle; $\gamma^*_m$ and $\beta^*_m$ are predicted values of the yaw rate and the sideslip angle of the vehicle at the next moment under the differential torque condition; $\Delta M$ is an estimated value of the additional yaw moment applied after operation of the differential braking system; t is a step size calculated by a controller; and $I_z$ is a moment of inertia of the vehicle.

The estimated value of the additional yaw moment is as follows:

$$\Delta M = 2*(F_{11} + F_{12} + F_{21} + F_{22})/L$$

in the formula: $F_{11}$, $F_{12}$, $F_{21}$ and $F_{22}$ are longitudinal forces applied to a front left wheel, a front right wheel, a rear left wheel and a rear right wheel of the vehicle and decided by the differential braking system; and L is a wheel track of the vehicle.

S4 includes:

S41: predicting the tire lateral force $F_{y\_p}$ at the next moment under the non-differential torque condition based on the nonlinear tire model and the state of the vehicle at the next moment under the non-differential torque condition;

S42: predicting the tire lateral force $F_{y\_pm}$ at the next moment under the differential torque condition based on the nonlinear tire model and the state of the vehicle at the next moment under the differential torque condition; and S43: calculating a predicted one-step change value $F_{y\_change}$ of a front tire lateral force under the influence of a differential torque:

$$F_{y\_change} = F_{y\_pm} - F_{y\_p}$$

in the formula: $F_{y\_change}$ represents a sudden change value of a front tire lateral force caused by the differential braking system under one control step. The tire lateral force under the non-differential torque condition is calculated as follows:

$$v_{y\_p} = \beta^* * v_x$$

$$\alpha = \delta_f - \arctan\left(\frac{v_{y\_p} + a\gamma^*}{v_x}\right)$$

$$F_{y\_p} = \mu * m * g * b/(a+b) * \left(\frac{2}{1+e^{-35\alpha}} - 1\right)$$

in the formulas: $v_{y\_p}$ is an estimated value of a lateral velocity of the vehicle at the next moment under the non-differential torque condition; $\alpha$ is an estimated value of the front wheel slip angle at the next moment under the non-differential torque condition; and $F_{y\_p}$ is an estimated value of the front tire lateral force at the next moment under the non-differential torque condition.

The tire lateral force under the differential torque condition is calculated as follows:

$$v_{y\_pm} = \beta_m^* * v_x$$

$$\alpha = \delta_f - \arctan\left(\frac{v_{y\_pm} + a\gamma_m^*}{v_x}\right)$$

$$F_{y\_pm} = \mu * m * g * b/(a+b) * \left(\frac{2}{1+e^{-35\alpha m}} - 1\right)$$

in the formulas: $v_{y\_pm}$ is an estimated value of a lateral velocity of the vehicle at the next moment under the differential torque condition; $\alpha_m$ is an estimated value of the front wheel slip angle at the next moment under the differential torque condition; and $F_{y\_pm}$ is an estimated value of the front tire lateral force at the next moment under the differential torque condition.

The continuous change amount of the tire lateral force in S5 is calculated as follows:

$$F_{t\_change} = \sum_1^T \left(F_{y\_change}^i\right) = \sum_1^T \left(F_{y\_pm}^i - F_{y\_p}^i\right)$$

in the formula: T is a continuous working time of the differential braking system under an assistance condition; $F_{y\_n}^i$ is an estimated value of the front tire lateral force under the non-differential torque condition at a ith moment; $F_{y\_pm}^i$ is an estimated value of the front tire lateral force under the non-differential torque condition at the ith moment; $F_{y\_change}^i$ is a predicted one-step change value of the front tire lateral force under an influence of a differential torque at the ith moment; and $F_{t\_change}$ is a change value of the front tire lateral force caused by the differential braking system at a tth moment.

The desired moment of the steering power motor in S6 is corrected as follows:

$$T_{ass} = T_{asso} + F_{t\_change}/i_{ceps}$$

in the formula: $T_{asso}$ is a desired moment of a power motor of original steering power motor control decision; $F_{t\_change}$ is a change value of the front tire lateral force caused by the differential braking system at a tth moment; $i_{ceps}$ is a gear ratio of a steering system; and $T_{ass}$ is a corrected desired moment of the steering power motor.

Compared with the prior art, the present disclosure has the following beneficial effects:

Since an additional yaw is a main reason for a change of a steering hand moment, the present disclosure realizes the purpose of predicting a change of a steering load moment by estimating the additional yaw caused by an additional longitudinal force of decision and inversely solving a change of a steering load force in combination with a two-degree-of-freedom vehicle model. An assistant moment changes in advance to avoid the change of the hand moment. Furthermore, since the influence of the additional yaw applied by the differential braking system on the steering load moment is continuous, by integrating time, the present disclosure adapts to a change condition of the steering hand moment caused when the differential braking system continuously works. The problem that a sudden change of the steering hand moment caused when the differential braking system assists in driving influences driver experience can be solved.

DETAILED DESCRIPTION OF THE EMBODIMENTS

The present disclosure will be described in detail below with reference to the drawings and specific embodiments.

The embodiments are implemented on the premise of the technical solutions of the present disclosure. The following presents detailed implementations and specific operation processes. The protection scope of the present disclosure, however, is not limited to the following embodiments.

Figure 1:
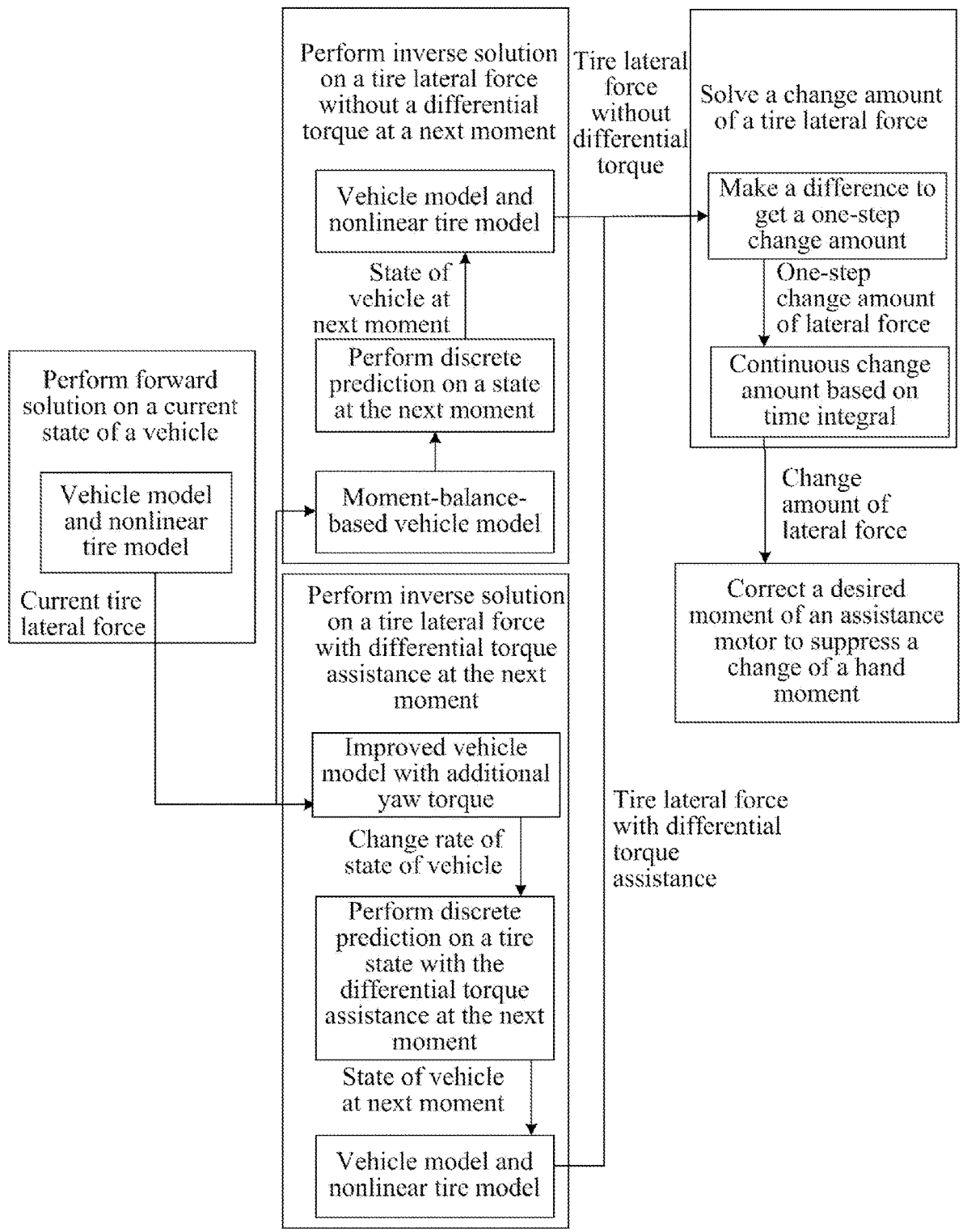
FIG. 1 is a flowchart of a method according to the present disclosure.

As shown in FIG. 1, the embodiment provides a steering wheel torque feedback optimization control method for a differential braking system, including:

S1: estimate a tire lateral force of a vehicle based on a two-degree-of-freedom vehicle model and a nonlinear tire model.

This step is used to estimate the current tire lateral force, so as to calculate a steering load moment at the current moment. A tire slip angle is calculated by the two-degree-of-freedom vehicle model, and then the tire lateral force is calculated according to the nonlinear tire model as follows:

$$\alpha_1 = \delta_f - \arctan\left(\frac{v_y + a\gamma}{v_x}\right)$$

$$\alpha_2 = \arctan\left(\frac{-v_y + b\gamma}{v_x}\right)$$

$$F_{y1\_p} = \mu * m * g * b/(a+b) * \left(\frac{2}{1 + e^{-35\alpha_1}} - 1\right)$$

$$F_{y2\_p} = \mu * m * g * a/(a+b) * \left(\frac{2}{1 + e^{-35\alpha_2}} - 1\right)$$

in the formulas: a and b are a distance between a front wheel and center of mass of the vehicle and a distance between a rear wheel and the center of mass of the vehicle respectively; m is mass of the vehicle; $v_x$ and $v_y$ are a lateral velocity and a longitudinal velocity of the vehicle respectively; $\gamma$ is a yaw rate of the vehicle; g is acceleration of gravity; $\mu$ is a ground adhesion coefficient; $\delta_f$ is a steering angle of a steering wheel in a current state; $\alpha_1$ and $\alpha_2$ represent a front wheel slip angle and a rear wheel slip angle of the vehicle respectively; and $F_{y1\_p}$ and $F_{y2\_p}$ are a front tire lateral force and a rear tire lateral force of the vehicle respectively.

S2: predict a state of the vehicle at a next moment based on the tire lateral force under a non-differential torque condition by using a moment-balance-based two-degree-of-freedom vehicle model.

Specifically, the current state of the vehicle, that is, yaw acceleration and a change rate of a sideslip angle, is estimated by means of a simplified moment-balance-based two-degree-of-freedom vehicle model, and a yaw rate and a sideslip angle at the next moment are predicted based on the yaw acceleration and the change rate of the sideslip angle as follows:

$$\begin{cases} \dot{\gamma} = (F_{y1\_p} * a - F_{y2\_p} * b)/I_z \\ \dot{\beta} = (F_{y1\_p} + F_{y2\_p})/(mv_x) - \gamma \end{cases}$$

$$\gamma^* = \dot{\gamma} * t + \gamma\beta^* = \dot{\beta} * t + \beta$$

in the formulas: $\gamma$ and $\dot{\gamma}$ are the yaw rate and yaw acceleration respectively; $\beta$ and $\dot{\beta}$ are a sideslip angle and a change rate of the sideslip angle respectively; t is a step size calculated by a controller; $\gamma^*$ and $\beta^*$ are predicted values of the yaw rate and the sideslip angle of the vehicle at the next moment respectively; and $I_z$ is a moment of inertia of the vehicle.

S3: estimate a state change rate of the vehicle based on the tire lateral force under a differential torque condition by using an improved two-degree-of-freedom vehicle model with an additional yaw moment, and predict a state of the vehicle at the next moment under the differential torque condition.

Specifically, according to the simplified moment-balance-based two-degree-of-freedom vehicle model, and considering an influence of the additional yaw moment without differential braking system decision on an attitude of the vehicle, the following improved two-degree-of-freedom vehicle model is constructed to predict the yaw rate and the sideslip angle at the next moment as follows:

$$\begin{cases} \dot{\gamma}_m = (F_{y1\_p}a - F_{y2\_p}b + \Delta M)/I_Z \\ \dot{\beta}_m = (F_{y1\_p} + F_{y2\_p})/(mv_x) - \gamma \end{cases}$$

$$\gamma_m^* = \dot{\gamma}_m * t + \gamma \beta_m^* = \dot{\beta}_m * t + \beta$$

In the formulas: $\dot{\gamma}_m$ is an estimated value of yaw acceleration of the vehicle under the differential torque condition; $\dot{\beta}_m$ is a change rate of a sideslip angle of the vehicle under the differential torque condition; $\dot{\gamma}_m$ and $\dot{\beta}_m$ represent a change rate of the state of the vehicle; $\gamma^*_m$ and $\beta^*_m$ are predicted values of the yaw rate and the sideslip angle of the vehicle at the next moment under the differential torque condition; and $\Delta M$ is an estimated value of the additional yaw moment applied after operation of the differential braking system.

According to a control target, a differential braking system controller decides a tire longitudinal force applied to each wheel. A decision value is related to design of the differential braking system controller, which is not the focus of the present disclosure and is not repeated herein. The additional yaw moment can be obtained according to a torque calculation formula:

$$\Delta M = 2*(F_{11} + F_{12} + F_{21} + F_{22})/L$$

in the formula: $F_{11}$, $F_{12}$, $F_{21}$ and $F_{22}$ are longitudinal forces applied to a front left wheel, a front right wheel, a rear left wheel and a rear right wheel of the vehicle and decided by the differential braking system; and L is a wheel track of the vehicle.

S4: calculate tire lateral forces at the next moment under the differential torque condition and the non-differential torque condition separately by using the nonlinear tire model based on the predicted states of the vehicle at the next moment under the differential torque condition and the non-differential torque condition, and obtain a predicted one-step change value of a front tire lateral force under an influence of a differential torque by performing subtraction.

S41: predict the tire lateral force $F_{y\_p}$ at the next moment under the non-differential torque condition based on the nonlinear tire model and the state of the vehicle at the next moment under the non-differential torque condition.

$$v_{y\_p} = \beta^* * v_x$$

$$\alpha = \delta_f - \arctan\left(\frac{v_{y\_p} + a\gamma^*}{v_x}\right)$$

$$F_{y\_p} = \mu * m * g * b/(a+b) * \left(\frac{2}{1+e^{-35\alpha}} - 1\right)$$

In the formulas: $v_{y\_p}$ is an estimated value of a lateral velocity of the vehicle at the next moment under the non-differential torque condition; a is an estimated value of the front wheel slip angle at the next moment under the non-differential torque condition; and $F_{y\_p}$ is an estimated value of the front tire lateral force at the next moment under the non-differential torque condition.

S42: predict the tire lateral force $F_{y\_pm}$ at the next moment under the differential torque condition based on the nonlinear tire model and the state of the vehicle at the next moment under the differential torque condition.

$$v_{y\_pm} = \beta_m^* * v_x$$

$$\alpha = \delta_f - \arctan\left(\frac{v_{y\_pm} + a\gamma_m^*}{v_x}\right)$$

$$F_{y\_pm} = \mu * m * g * b/(a+b) * \left(\frac{2}{1+e^{-35\alpha_m}} - 1\right)$$

In the formulas: $v_{y\_pm}$ is an estimated value of a lateral velocity of the vehicle at the next moment under the differential torque condition; $\alpha_m$ is an estimated value of the front wheel slip angle at the next moment under the differential torque condition; and $F_{y\_pm}$ is an estimated value of the front wire lateral force at the next moment under the differential torque condition.

S43: calculate a predicted one-step change value $F_{y\_change}$ of a front tire lateral force under the influence of a differential torque.

$$F_{y\_change} = F_{y\_pm} - F_{y\_p}$$

In the formula: $F_{y\_change}$ represents a sudden change value of a front tire lateral force caused by the differential braking system under one control step.

The purpose of S1-S4 is to calculate a wheel lateral change caused by the application of the additional wheel lateral force, and to correct the desired moment of the steering power motor in advance by estimating a change value of the wheel lateral change, so as to suppress a change of a hand moment of a driver.

S5: integrate the predicted one-step change value of a front tire lateral force based on time for calculation, and obtain a continuous change amount of the tire lateral force.

Since the influence of the additional yaw applied by the differential braking system on the steering load moment is continuous, by means of a solution of integrating a time, the present disclosure adapts to a change condition of the steering hand moment caused when the differential braking system continuously works.

$$F_{t\_change} = \sum_1^T \left(F_{y\_change}^i\right) = \sum_1^T \left(F_{y\_pm}^i - F_{y\_p}^i\right)$$

In the formula: T is a continuous working time of the differential braking system under an assistance condition; $F_{y\_p}^i$ is an estimated value of the front tire lateral force under the non-differential torque condition at a ith moment; $F_{y\_pm}^i$ is an estimated value of the front wheel tire force under the non-differential torque condition at the ith moment; $F_{y\_change}^i$ is a predicted one-step change value of the front tire lateral force under an influence of a differential torque at the ith moment; and $F_{t\_change}$ is a change value of the front wheel tire force caused by the differential braking system at a tth moment.

S6: correct a desired moment of a steering power motor based on the continuous change amount of the tire lateral force, suppress a change of a hand moment, and optimize driving experience.

In order to avoid influencing the driving experience due to the change of the hand moment caused by the differential braking system, the change of the front tire lateral force caused by the differential braking system needs to be eliminated by correcting power strength of the power motor at the next moment. A formula for calculating the desired moment of the power motor at the next moment is constructed as follows:

$$T_{ass}=T_{asso}+F_{t\_change}/i_{ceps}$$

In the formula: $T_{asso}$ is a desired moment of a power motor of original steering power motor control decision; $F_{t\_change}$ is a change value of the front tire lateral force caused by the differential braking system at a tth moment; $i_{ceps}$ is a gear ratio of a steering system; and $T_{ass}$ is a corrected desired moment of the steering power motor.

In order to verify practical effects of the above method, the embodiment executes an angle step test and a slope test separately, to verify the effects of the present disclosure on suppressing the change of the tire lateral force.

1. Angle Step Test

Figure 2:
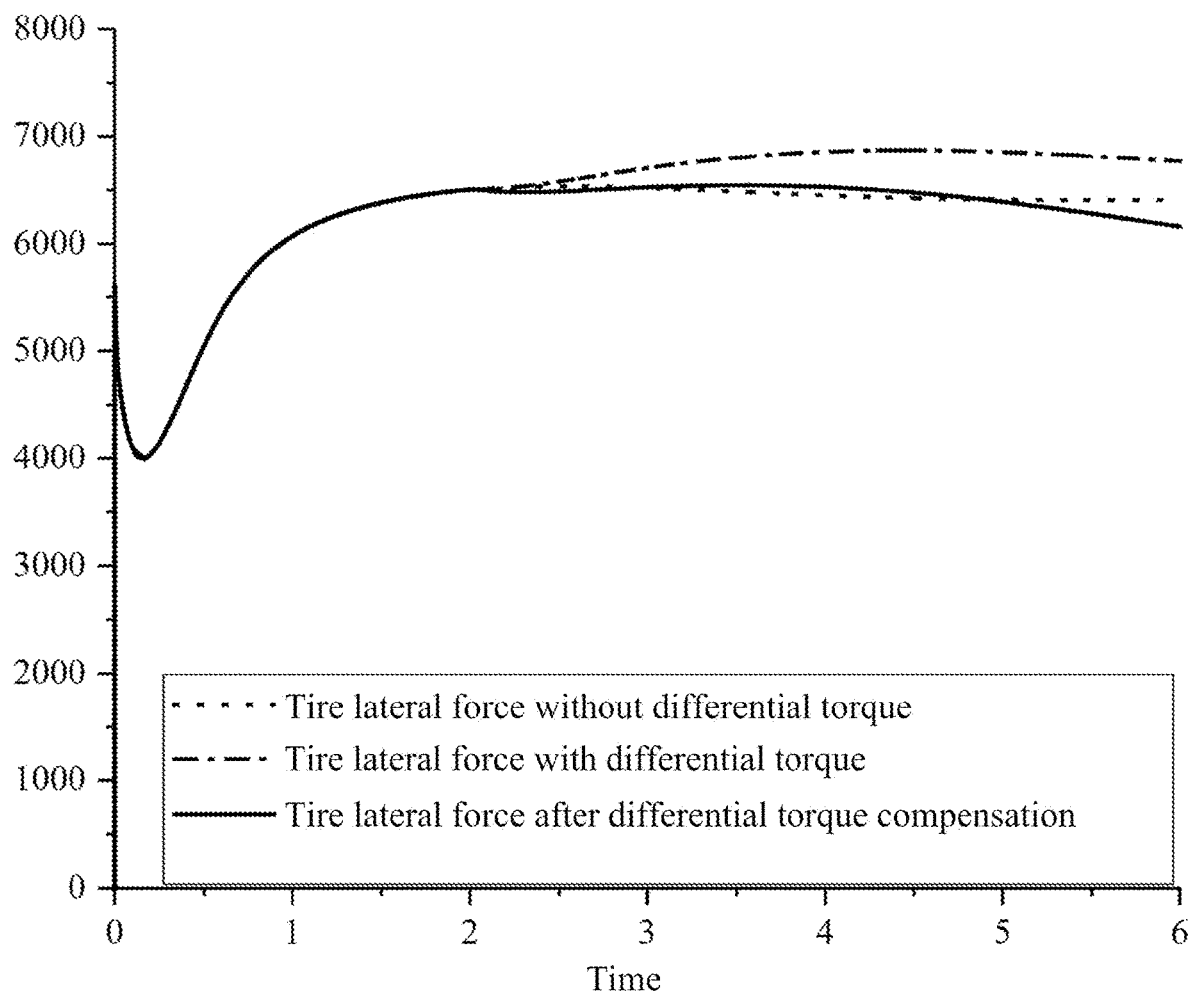
FIG. 2 is a schematic diagram of a change of a tire lateral force in an angle step test according to an embodiment of the present disclosure.

A driving velocity is 80 km/s, a fixed steering angle of a steering wheel is 40 deg, a differential torque step signal with an additional drive moment of 200 Nm is applied to a wheel edge, and an additional yaw moment is 513.5 Nm. Such a condition corresponds to an emergency condition in which vehicle instability is avoided by the differential braking system. Simulation results from CarSim-MATLAB are shown in FIG. 2. In FIG. 2, a dotted line shows a tire lateral force without a differential torque; a dot-dash line shows a tire lateral force with a differential torque; and a solid line shows a tire lateral force after differential torque compensation. It can be seen from the figure that the present disclosure has an obvious effect on suppressing the change of the tire lateral force under the condition.

2. Slope Test

Figure 3:
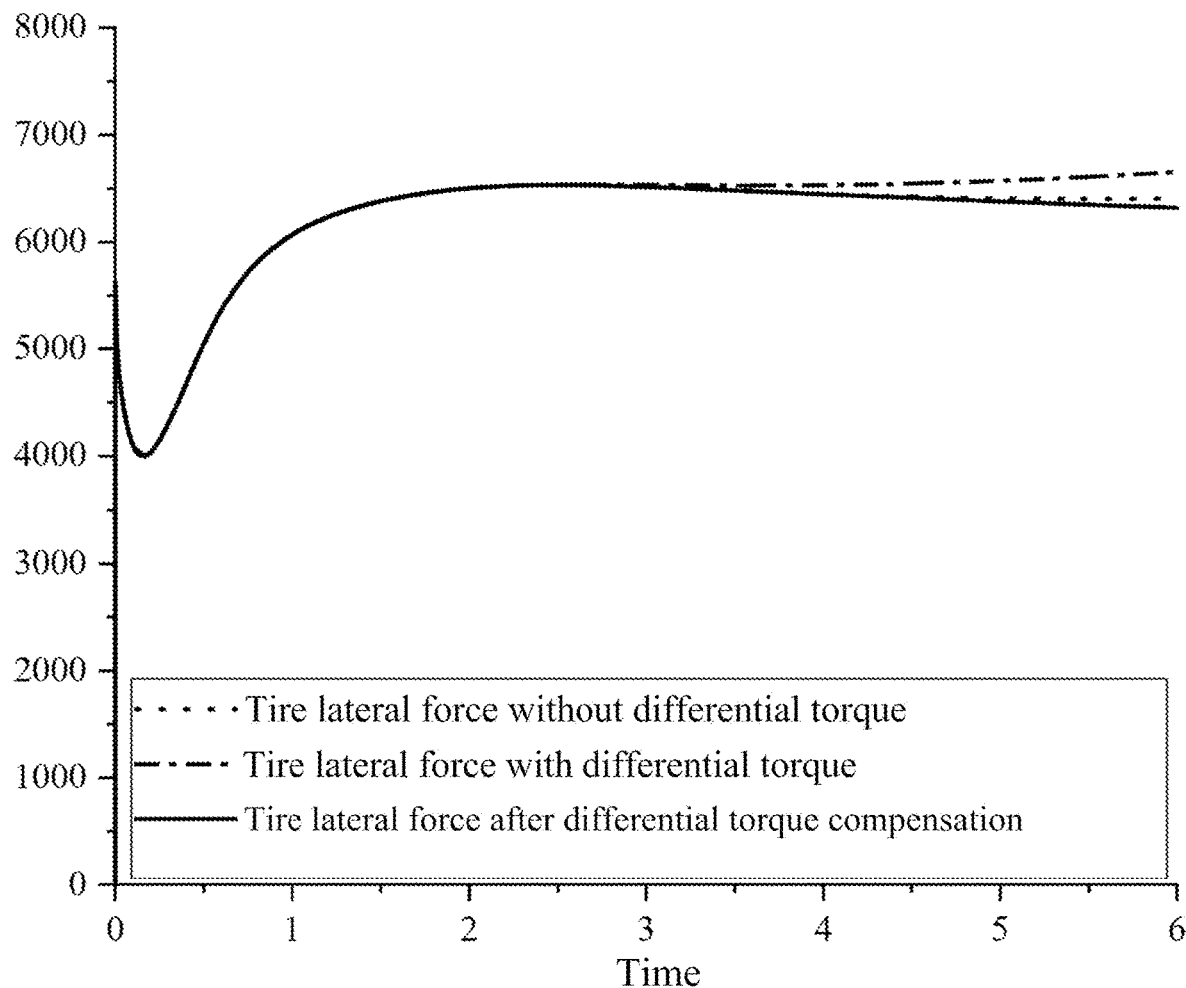
FIG. 3 is a schematic diagram of a change of a tire lateral force in a slope test according to an embodiment of the present disclosure.

A driving velocity is 80 km/s, a fixed steering angle of a steering wheel is 40 deg, a differential torque step signal with an additional drive moment of 44 Nm/s is applied to a wheel edge, and an additional yaw moment is 115 Nm/s. Such a condition corresponds to a condition in which the differential braking system assists a driver in steering to reduce the driving burden of the driver. Simulation results by CarSim-MATLAB are shown in FIG. 3. In FIG. 3, a dotted line shows a tire lateral force without a differential torque; a dot-dash line shows a tire lateral force with a differential torque; and a solid line shows a tire lateral force after differential torque compensation. It can be seen from the figure that the present disclosure has an obvious effect on suppressing the change of the tire lateral force under the condition.

The foregoing is detailed description of the preferred specific embodiments of the present disclosure. It should be understood that those of ordinary skill in the art can make various modifications and variations according to the concept of the present disclosure without creative efforts. Therefore, all technical solutions that a person skilled in the art can obtain based on the prior art through logical analysis, reasoning, or finite experiments according to the concept of the present disclosure shall fall within the scope of protection defined by the appended claims.

What is claimed is:

1. A steering wheel torque feedback optimization control method for a differential braking system, comprising:

S1: estimating a tire lateral force of a vehicle based on a two-degree-of-freedom vehicle model and a nonlinear tire model;

S2: predicting a state of the vehicle at a next moment based on the tire lateral force under a non-differential torque condition by using a moment-balance-based two-degree-of-freedom vehicle model;

S3: estimating a state change rate of the vehicle based on the tire lateral force under a differential torque condition by using an improved two-degree-of-freedom vehicle model with an additional yaw moment, and predicting a state of the vehicle at the next moment under the differential torque condition;

S4: calculating tire lateral forces at the next moment under the differential torque condition and the non-differential torque condition separately by using the nonlinear tire model based on the predicted states of the vehicle at the next moment under the differential torque condition and the non-differential torque condition, and obtaining a predicted one-step change value of a front tire lateral force under an influence of a differential torque by performing subtraction;

S5: integrating the predicted one-step change value of a front tire lateral force based on time for calculation, and obtaining a continuous change amount of the tire lateral force; and S6: correcting a desired moment of a steering power motor based on the continuous change amount of the tire lateral force, suppressing a change of a hand moment.

2. The steering wheel torque feedback optimization control method for a differential braking system according to claim 1, wherein the tire lateral force of the vehicle in S1 is estimated and calculated as follows:

$$\alpha_1 = \delta_f - \arctan\left(\frac{v_y + a\gamma}{v_x}\right)$$

$$\alpha_2 = \arctan\left(\frac{-v_y + b\gamma}{v_x}\right)$$

$$F_{y1\_p} = \mu * m * g * b/(a+b) * \left(\frac{2}{1+e^{-35\alpha_1}} - 1\right)$$

$$F_{y2\_p} = \mu * m * g * a/(a+b) * \left(\frac{2}{1+e^{-35\alpha_2}} - 1\right)$$

in the formulas: a and b are a distance between a front wheel and center of mass of the vehicle and a distance between a rear wheel and the center of mass of the vehicle respectively; m is mass of the vehicle; $v_x$ and $v_y$ are a lateral velocity and a longitudinal velocity of the vehicle respectively; $\gamma$ is a yaw rate of the vehicle; g is acceleration of gravity; $\mu$ is a ground adhesion coefficient; $\delta_f$ is a steering angle of a steering wheel in a current state; $\alpha_1$ and $\alpha_2$ represent a front wheel slip angle and a rear wheel slip angle of the vehicle respectively; and $F_{y1\_p}$ and $F_{y2\_p}$ are a front tire lateral force and a rear tire lateral force of the vehicle respectively.

3. The steering wheel torque feedback optimization control method for a differential braking system according to claim 2, wherein the state of the vehicle at the next moment under the non-differential torque condition in S2 is predicted and calculated as follows:

$$\begin{cases} \dot{\gamma} = (F_{y1\_p} * a - F_{y2\_p} * b)/I_z \\ \dot{\beta} = (F_{y1\_p} + F_{y2\_p})/(mv_x) - \gamma \end{cases}$$

$$\gamma^* = \dot{\gamma} * t + \gamma \beta^* = \dot{\beta} * t + \beta$$

in the formulas: γ and γ̇ are the yaw rate and yaw acceleration respectively; β and β̇ are a sideslip angle and a change rate of the sideslip angle respectively; t is a step size calculated by a controller; γ* and β* are predicted values of the yaw rate and the sideslip angle of the vehicle at the next moment respectively; and $I_z$ is a moment of inertia of the vehicle.

4. The steering wheel torque feedback optimization control method for a differential braking system according to claim 3, wherein the tire lateral force under the non-differential torque condition is calculated as follows:

$$v_{y\_p} = \beta^* * v_x$$

$$\alpha = \delta_f - \arctan\left(\frac{v_{y\_p} + a\gamma^*}{v_x}\right)$$

$$F_{y\_p} = \mu * m * g * b/(a+b) * \left(\frac{2}{1+e^{-35\alpha}} - 1\right)$$

in the formulas: $v_{y\_p}$ is an estimated value of a lateral velocity of the vehicle at the next moment under the non-differential torque condition; α is an estimated value of the front wheel slip angle at the next moment under the non-differential torque condition; and $F_{y\_p}$ is an estimated value of the front tire lateral force at the next moment under the non-differential torque condition.

5. The steering wheel torque feedback optimization control method for a differential braking system according to claim 2, wherein the state of the vehicle at the next moment under the differential torque condition in S3 is predicted and calculated as follows:

$$\begin{cases} \dot{\gamma}_m = (F_{y1\_p}a - F_{y2\_p}b + \Delta M)/I_Z \\ \dot{\beta}_m = (F_{y1\_p} + F_{y2\_p})/(mv_x) - \gamma \end{cases}$$

$$\gamma_m^* = \dot{\gamma}_m * t + \gamma \quad \beta_m^* = \dot{\beta}_m * t + \beta$$

in the formulas: γ is the yaw rate, $\dot{\gamma}_m$ is an estimated value of yaw acceleration of the vehicle under the differential torque condition; β is a sideslip angle, and $\dot{\beta}_m$ is a change rate of the sideslip angle of the vehicle under the differential torque condition; $\dot{\gamma}_m$ and $\dot{\beta}_m$ represent a change rate of the state of the vehicle; $\gamma^*_m$, and $\beta^*_m$ are predicted values of the yaw rate and the sideslip angle of the vehicle at the next moment under the differential torque condition; ΔM is an estimated value of the additional yaw moment applied after operation of the differential braking system; t is a step size calculated by a controller; and $I_z$ is a moment of inertia of the vehicle.

6. The steering wheel torque feedback optimization control method for a differential braking system according to claim 5, wherein the estimated value of the additional yaw moment is as follows:

$$\Delta M = 2*(F_{11}+F_{12}+F_{21}+F_{22})/L$$

in the formula: $F_{11}$, $F_{12}$, $F_{21}$ and $F_{22}$ are longitudinal forces applied to a front left wheel, a front right wheel, a rear left wheel and a rear right wheel of the vehicle and decided by the differential braking system; and L is a wheel track of the vehicle.

7. The steering wheel torque feedback optimization control method for a differential braking system according to claim 5, wherein the tire lateral force under the differential torque condition is calculated as follows:

$$v_{y\_pm} = \beta_m^* * v_x$$

$$\alpha_m = \delta_f - \arctan\left(\frac{v_{y\_pm} + a\gamma_m^*}{v_x}\right)$$

$$F_{y\_pm} = \mu * m * g * b/(a+b) * \left(\frac{2}{1+e^{-35\alpha_m}} - 1\right)$$

in the formulas: $v_{y\_pm}$ is an estimated value of a lateral velocity of the vehicle at the next moment under the differential torque condition; $\alpha_m$ is an estimated value of the front wheel slip angle at the next moment under the differential torque condition; and $F_{y\_pm}$ is an estimated value of the front tire lateral force at the next moment under the differential torque condition.

8. The steering wheel torque feedback optimization control method for a differential braking system according to claim 1, wherein S4 comprises:

S41: predicting the tire lateral force $F_{y\_p}$ at the next moment under the non-differential torque condition based on the nonlinear tire model and the state of the vehicle at the next moment under the non-differential torque condition;

S42: predicting the tire lateral force $F_{y\_pm}$ at the next moment under the differential torque condition based on the nonlinear tire model and the state of the vehicle at the next moment under the differential torque condition; and S43: calculating a predicted one-step change value $F_{y\_change}$ of a front tire lateral force under the influence of a differential torque:

$$F_{y\_change} = F_{y\_pm} - F_{y\_p}$$

wherein in the formula: $F_{y\_change}$ represents a sudden change value of a front tire lateral force caused by the differential braking system under one control step.

9. The steering wheel torque feedback optimization control method for a differential braking system according to claim 1, wherein the continuous change amount of the tire lateral force in S5 is calculated as follows:

$$F_{t\_change} = \sum_1^T (F^i_{y\_change}) = \sum_1^T (F^i_{y\_pm} - F^i_{y\_p})$$

in the formula: T is a continuous working time of the differential braking system under an assistance condition; $F_{y\_p}^i$ is an estimated value of the front tire lateral force under the non-differential torque condition at a ith moment; $F_{y\_pm}^i$ is an estimated value of the front tire lateral force under the non-differential torque condition at the ith moment; $F_{y\_change}^i$ is a predicted one-step change value of the front tire lateral force under an influence of a differential torque at the ith moment; and $F_{t\_change}$ is a change value of the front tire lateral force caused by the differential braking system at a tth moment.

10. The steering wheel torque feedback optimization control method for a differential braking system according to claim 1, wherein the desired moment of the steering power motor in S6 is corrected as follows:

$$T_{ass} = T_{asso} + F_{t\_change}/i_{ceops}$$

in the formula: $T_{asso}$ is a desired moment of a power motor of original steering power motor control decision; $F_{t\_change}$ is a change value of the front tire lateral force caused by the differential braking system at a tth moment; $i_{ceps}$ is a gear ratio of a steering system; and $T_{ass}$ is a corrected desired moment of the steering power motor.

* * * * *